United States Patent Office 3,284,417
Patented Nov. 8, 1966

3,284,417
PROCESS FOR THE PREPARATION OF LACTONE POLYESTERS
Fritz Hostettler, George Magnus, and Harry Vineyard, Charleston, W. Va., assignors to Union Carbide Corporation, a corporation of New York
No Drawing. Filed Nov. 13, 1963, Ser. No. 323,222
13 Claims. (Cl. 260—78.3)

This invention relates to an improved process for the production of lactone polyesters which are useful as plasticizers and as intermediates for the preparation of elastomers and foams.

The facility with which the various lacetones react and polymerize upon reaction with an organic functional initiator which has at least one reactive hydrogen substituent capable of opening the lactone ring to form lactone polyesters having terminal hydroxyl and/or carboxyl groups has been found to vary considerably. Thus, for example, dimethyl- and epsilon-methyl-epsilon-caprolactones are difficult to react and polymerize, even with the use of strongly basic ester exchange catalysts, without causing the resulting lactone polyester product to be discolored.

It has been unexpectedly and surprisingly discovered that the lactones can be greatly accelerated, without incurring discoloration of the lactone polyesters, by employing stannous diacylate or stannic tetraacylate as a catalyst in the polymerization reaction.

The catalysts which bring about the aforesaid illustrative advantages, as indicated above, are the stannous diacylates, of the formula

and the stannic tetraacylates of the formula

wherein the R variables are hydrogen or hydrocarbyl. Particularly preferred classes of catalysts are the stannous dialkanoates and the stannic tetraalkanoates, especially those in which the alkanoate moieties contain from 1 to 20 carbon atoms. Specific catalysts are exemplified by stannous diacetate, stannous dibutanoate, stannous dioctanoate, stannous di(2-ethylhexanoate), stannous didecanoate, stannous distearate, stannic tetraacetate, stannic tetrabutanoate, stannic tetraoctanoate, stannic tetra-(2-ethylhexanoate), stannic tetradecanoate, and stannic tetrastearate. The catalysts which have been found to be particularly effective and for this reason extremely preferred are the stannous dioctanoates and the stannic tetraoctanoates.

While the method of the invention is particularly useful in the polymerization of lactones that are difficult to polymerize by other means, it is also of considerable advantage in the polymerization of other lactones that are not difficult to polymerize. The instant process has the unique distinction of not only reducing the reaction time very substantially, i.e., from a matter of days and even weeks to a few hours and even less, but also of minimizing and in most instances avoiding discoloration of the end product.

The lactone polyesters with which this invention is concerned include polyesters of individual unsubstituted and substituted lactones, copolyesters of different substituted lactones and copolyesters of substituted and unsubstituted lactones, as well as blends thereof.

The lactone used as a starting material may by any lactone, or combination of lactones, having at least six carbon atoms, for example, from six to eight carbon atoms, in the ring and at least one hydrogen substituent on the carbon atom which is attached to the oxy group in said ring. In one aspect, the lactone used as starting material can be represented by the general formula:

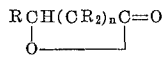

in which $n$ is at least four, for example, from four to six, at least $n+2$ R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for purposes of the invention because of the tendency that polymers thereof have to revert to the monomer, particularly at elevated temperature.

The lactones preferred in this invention are the epsilon-caprolactones having the general formula:

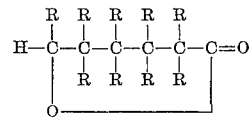

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsiloncaprolactone, in which all the R's are hydrogen, is derived from 6-hydroxyhexanoic acid. Substituted epsilon-caprolactones, and mixtures thereof, are available by reacting a corresponding substituted cyclohexanone with an oxidizing agent such as peracetic acid, as described in copending application Serial No. 548,754, filed November 23, 1955, now abandoned. The cyclohexanones may be obtained from substituted phenols or by other convenient synthetic routes.

Among the substituted epsilon-caprolactones conidered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups ars substituted on the same of different carbon atoms, but not both on the epsilon carbon atom; trialkyl epsilon-caprolactones in which two or threee carbon atoms in the lactone ring are substituted, so long as the epsilon carbon atom is not disubstituted; alkoxy epsilon-caprolactones such as methoxy and ethoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enantholactone and eta-caprylolactone may also be polymerized in accordance with the method of the invention.

Polymerization of the lactone in accordance with the method of the invention is initiated by reaction with one or more compounds having at least one reactive hydrogen capable, with or without the aid of a catalyst, of opening the lactone ring and adding it as an open chain without forming water of condensation. Compounds that are suitable for initiating the polymerization, and therefore referred to herein as initiators, include monofunctoinal initiators such as alcohols and amines, and polyfunctional initiators such as polyols, polyamines, amino alcohols, and vinyl polymers, as well as amides, sulfonamides, hydrozones, semicarbazones, oximes, polycarboxylic acids, hydroxy carboxylic acids, and aminocarboxylic acids.

Alcohols that are useful as monofunctional initiators include primary, secondary, and tertiary aliphatic alcohols such as methanol, ethanol, propanol, isopropanol, 1-butanol, 2-butanol, tert.-butanol, 1-pentanol, 3-pentanol, tert-amyl alcohol, 1-hexanol, 4-methyl-3-pentanol, 2-ethyl-1-butanol, 1-heptanol, 3-heptanol, 1-octanol, 2-ethyl-1-hexanol, 1-nonanol, 2,6-dimethyl-4-heptanol, 2,6,8-trimethyl-4-nonanol, 5-ethyl-2-nonanol, 7-ethyl-2-methyl-4-undecanol, 3,9-triethyl-6-decanol, and lauryl alcohol; aromatic alcohols such as benzyl alcohol and phenyl methyl carbinol; and cycloaliphatic alcohols such as cyclohexanol and trimethylcyclohexanol.

Amines that are useful as monofunctional initiators include primary and secondary aliphatic amines such as methyl, ethyl n-propyl, isopropyl, n-butyl, sec-butyl, isobutyl, tert-butyl, n-amyl, n-hexyl and 2-ethylhexylamine, as well as the corresponding dialkyl amines; aromatic amines such as aniline, ortho-toluidine, meta-toluidine, and diphenylamine; cycloaliphatic amines such as cyclohexyl- and dicyclohexylamine; and heterocyclic amines such as pyrrolidine, piperidine, and morpholine.

Diols that are suitable as bifunctional initiators include glycols of the formula $HO(CH_2)_nOH$ in which $n$ equals 2 to 10, glycols of the formulae $HO(CH_2CH_2O)_nH$ and $HO[CH(CH_3)CH_2O]_nH$ in which $n$ equals 1 to 40, such as ethylene glycol, diethylene glycol, and the like, 2,2-dimethyl-1,3-propanediol, 2,2-diethyl-1,3-propanediol, 3-methyl-1,5-pentanediol, N-methyl and N-ethyl diethanolamines, various cyclohexanediols, 4,4'-methylenebiscyclohexanol, 4,4'-isopropylidenebiscyclohexanol, various xylenediols, various hydroxymethyl-phenethyl alcohols, various hydroxymethyl-phenylpropanols, various phenylenediethanols, various phenylenedipropanols, and various heterocyclic diols such as 1,4-piperazinediethanol.

Other suitable diols include polyoxyalkylated derivatives of difunctional compounds having two reactive hydrogen atoms. These difunctional compounds may contain primary or secondary hydroxyls, phenolic hydroxyls, primary or secondary amino groups, amido, hydrazino, guanido, ureido, mercapto, sulfino, sulfonamide, or carboxyl groups. They are obtainable by reacting diols of the class $HO(CH_2)_nOH$, where $n$ equals 2 to 10, propylene glycol, thiodiethanol, xylenediols, 4,4'-methylenediphenol, 4,4'-isopropylidenediphenol, and resorcinol; mercapto alcohols, like mercaptoethanol; dibasic acids, such as maleic, succinic, glutaric, adipic, pimelic, sebacic, phthalic, tetrahydrophthalic, and hexahydrophthalic; phosphorus acid; aliphatic, aromatic, and cycloaliphatic primary monoamines, like methylamine, ethylamine, propylamine, butylamine, aniline, cyclohexylamine; secondary diamines, like N,N'-dimethylethylenediamine; and amino alcohols containing a secondary amino group, like N-methylethanolamine, with alkylene oxides such as ethylene oxide, propylene oxide, 1-butylene oxide, 2-butylene oxide, isobutylene oxide, butadiene monoxide, styrene oxide, and also mixtures of these monoepoxides.

The preparation of the polyoxyalkylated derivatives suitable for the purposes of the invention is illustrated by the reaction of 1,4-butanediol with ethylene oxide:

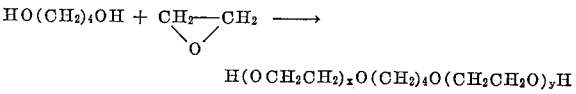

$H(OCH_2CH_2)_xO(CH_2)_4O(CH_2CH_2O)_yH$ where $x+y=1$ to 40.

Other useful bifunctional initiators are polymers of monoepoxides obtainable by polymerizing with such catalysts as oxonium salts of hydrogen halides; metal or non-metal halides whose etherates are oxonium complexes; electrophilic metal or non-metal halides in the presence of hydrogen halides, acyl halides, or anhydrides of inorganic and organic acids; and inorganic acids or anhydrides thereof whose anions show little tendency to polarize. Polymers containing hydroxyl end groups can be obtained by treating these products with alkaline reagents upon completion of the polymerization reaction.

Among suitable monoepoxides for preparing such polymers are tetrahydrofuran, trimethylene oxide, propylene oxide, ethylene oxide and mixtures thereof.

Higher functional alcohols suitable for initiating the polymerization of lactones in accordance with the method of the invention include triols such as glycerol, trimethylolpropane, 1,2,4-butanetriol, 1,2,6-hexanetriol, triethanolamine, and triisopropanolamine; various tetrols like erythritol, pentaerythritol, N,N,N',N'-tetrakis(2-hydroxyethyl)ethylenediamine, and N,N,N',N'-tetrakis(2-hydroxypropyl)ethylenediamine; pentols; hexols like dipentaerythritol and sorbitol; alkyl glycosides; and carbohydrates such as glucose, sucrose, starch, and cellulose.

Also suitable as polyols are the polyoxyalkylated derivatives of polyfunctional compounds having three or more reactive hydrogen atoms as, for example, the reaction product of trimethylolpropane with ethylene oxide in accordance with the reaction:

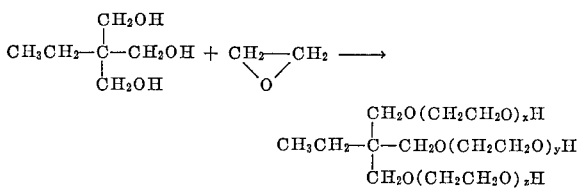

where $x+y+z=3$ to 45.

In addition to the polyoxyalkylated derivatives of trimethylolpropane, those of the following compounds are likewise suitable: glycerol, 1,2,4-butanetriol, 1,2,6-hexanetriol, erythritol, pentaerythritol, sorbitol, methyl glycosides, glucose, sucrose, diamines of the general formula $H_2N(CH_2)_nNH_2$, where $n$ equals 2 to 10, 2-(methylamino)ethylamine, various phenylene- and toluene-diamines, benzidine, 3,3'-dimethyl-4,4'-biphenyldiamine, 4,4'-methylene-dianiline, 4,4',4''-methylidynetrianiline, cycloaliphatic diamines, like 2,4-cyclohexanediamine and 1-methyl-2,4-cyclohexanediamine, amino alcohols of the general formula $HO(CH_2)_nNH_2$, where $n$ equals 2 to 10, diethylenetriamine, triethylenetetramine, tetraethylenepentamine, poly-carboxylic acids like citric acid, aconitic acid, mellitic acid, and pyromellitic acid, and polyfunctional inorganic acids like phosphoric acid.

Difunctional amino alcohols capable of initiating the polymerization of lactones include aliphatic amino alcohols of the general formula $HO(CH_2)_nNH_2$, where $n$ equals 2 to 10, N-methylethanolamine, isopropanolamine, N-methylisopropanolamine, aromatic amino alcohols like para-amino-phenethyl alcohol, and para-amino-alpha-methylbenzyl alcohol, and various cycloaliphatic amino alcohols like 4-aminocyclohexanol.

Higher functional amino alcohols having a total of at least three hydroxy and primary or secondary amino groups that are suitable in the method of the invention include diethanolamine, diisopropanolamine, 2-(2-aminoethylamino)ethanol $H_2NCH_2CH_2$—$NH$-$CH_2CH_2OH$, and 2-amino-2-(hydroxymethyl)-1,3-propanediol.

Suitable diamines include aliphatic diamines of the general forula $H_2N(CH_2)_nNH_2$, monosecondary diamines of the general formula $R''NH(CH_2)_nNH_2$, and disecondary diamines of the general formula

where $n$ equals 2 to 10 and where $R''$ is alkyl, aryl, aralkyl or cycloalkyl; aromatic diamines, like meta-phenylenediamine, para-phenylenediamine, toluene-2,4-diamine, toluene-2,6-diamine, 1,5-naphthalenediamine, 1,8-naphthalenediamine, meta-xylylenediamine, para-xylylenediamine, benzidine, 3,3'-dimethyl-4,4'-biphenyldiamine, 3,3'-dimethoxy-4,4'-biphenyldiamine, 3,3'-dichloro-4,4'-biphenyldiamine, 4,4'-methylenedianiline, 4,4'-ethylenedianiline, 2,3,5,6-tetramethylpara-phenylenediamine, 2,5-fluorenediamine, and 2,7-fluorenediamine; cycloaliphatic diamines like 1,4-cyclohexanediamine, 4,4'-methylenebiscyclohexylamine, and 4,4'-isopropylidenebiscyclohexylamine; and heterocyclic amines such as piperazine, 2,5-dimethylpiperazine, and 1,4-bis-(3-aminopropyl)piperazine.

Higher functional polyamines typical of those suitable for use in the method of the invention are: diethylenetriamine, triethylenetetraamine, tetraethylenepentamine, dipropylenetriamine, tripropylenetetramine, tetrapropylenepentamine, 1,2,5-benzenetriamine, toluene-2,4,6-triamine, and 4,4',4''-methylidynetrianilane and polyamines obtained by interaction of aromatic monoamines with formaldehyde or other aldehydes, for example:

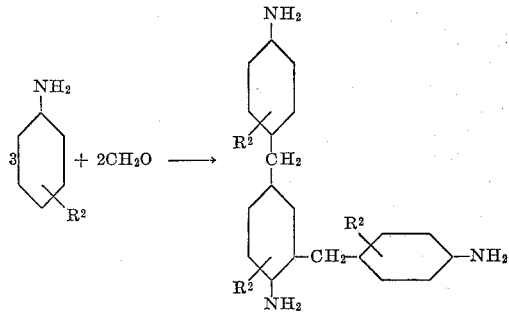

and other reaction products of the above general type, where $R^2$ is H or alkyl.

Lactones will also react with and polymerize on vinyl polymers containing reactive hydrogen atoms in side groups along the polymer molecule, particularly the reactive hydrogen atoms in hydroxyl and primary and secondary amino groups. Such vinyl polymers may, for example, be obtained by copolymerization of ethylene and vinyl acetate followed by subsequent saponification of the acetate groups to yield polymers represented by the following formula:

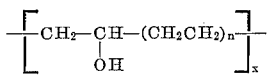

Other vinyl polymers that are suitable include polyvinyl alcohol, copolymers obtainable by copolymerization of a vinyl monomer such as ethylene with other vinyl monomers containing primary or secondary hydroxyl or amino groups or other groups containing reactive hydrogen atoms. Among the vinyl monomers from which such copolymers may, for example, be obtained are: ortho-, meta-, or para-aminostyrene, 3-butene-1,2-diol $CH_2=CH-CHOH-CH_2OH$, allyl alcohol, methallyl alcohol, 3-phenyl-3-butene-1-ol, and vinyl ethers like diethylene glycol monovinyl ether $$CH_2=CH-OCH_2CH_2OCH_2CH_2OH$$

Representatives of the many polycarboxylic acids that are suitable as polyfunctional initiators in the method of the invention are such dicarboxylic acids as oxalic acid, succinic acid, maleic acid, glutaric acid, adipic acid, pimelic acid, submeric acid, azelic acid, sebacic acid, 4,4'-oxydibutyric acid, 5,5'-oxydivaleric acid, 6,6'-oxydihexanoic acid, 4,4'-thiodibutyric acid, 5,5'-thiodivaleric acid, 6,6'-thiodihexanoic acid, itaconic acid, phthalic acid, isophthalic acid, terephthalic acid, 1,5-naphthoic acid, 2,7-naphthoic acid, 2,6-naphthoic acid, 3,3'-methylenedibenzoic acid, 4,4'-(ethylenedioxy)dibenzoic acid, 4,4'-biphenyl-dicarboxylic acid, 4,4'-sulfonyldibenzoic acid, 4,4'-oxydibenzoic acid, various tetrahydrophthalic acids, and various hexahydrophthalic acids, as well as higher functional acids such as tricarballylic acid, aconitric acid, citric acid, hemimellitic acid, trimellitic acid, trimesic acid, pyromellitic acid 1,2,3,4-butanetetracarboxylic acid.

Suitable hydroxy- and aminocarboxylic acids include 2-hydroxypropionic acid, 6-hydroxycaproic acid, 11-hydroxyundecanoic acid, salicyclic acid, parahydroxybenzoic acid, beta-alanine, 6-aminocaproic acid, 7-amino-heptanoic acid, 11-amino-undecanoic acid, and para-aminobenzoic acid.

The initiator is believed to open the lactone ring to produce an ester or amide having one or more terminal groups that are capable of opening further lactone rings and thereby of adding more and more lactone to the molecule. Thus, for example, the polymerization of epsilon-caprolactone initiated with an amino alcohol is believed to take place primarily as follows:

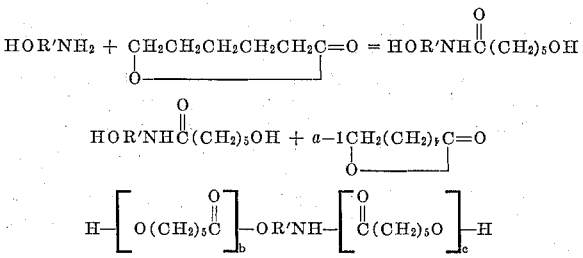

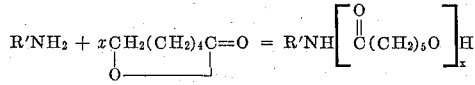

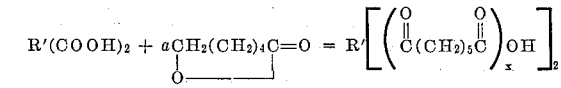

wherein $R'$ in the initiator and in the polyester is an organic radical selected from the group consisting of aliphatic, cycloaliphatic, aromatic and heterocyclic radicals, and $a=b+c$.

Similarly, a monoamine opens and adds a succession of lactone rings as shown in the equation:

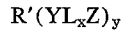

and a dicarboxylic acid, for example, takes part in polymerizing lactones somewhat as follows:

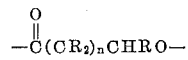

in which the average value of $x$ is $a/2$. It will be apparent from these equations that lactone polyesters prepared in accordance with this embodiment of the method of the invention can conveniently be represented by the general formula:

$$R'(YL_xZ)_y$$

in which the L's stand for substantially linear groups having the general formula:

$$-C(CR_2)_nCHRO-$$

wherein $n$ is at least four, at least $n+2$ R's are hydrogen, the remaining R's are substituents selected from the group consisting of hydrogen, alkyl, cycloalkyl, alkoxy and single ring aromatic hydrocarbon radicals, and the total number of carbon atoms in the substituents on a given residue does not exceed about twelve. The subscript $x$ is a number having an average value of at least two. The number of linear groups in the final polyester will depend in large part upon the molar ratio of lactone to initiator. $R'$ is the organic radical from the initiator and $y$ is a number equal to the functionality of the initiator, i.e., at least 1. The Y's stand for $-O-$, $-NH-$, $-NR''-$, and

$R''$ being a hydrocarbon radical selected from the group consisting of alkyl, aryl, aralkyl and cycloalkyl radicals, and the Z's stand for H or $-OH$, being $-OH$ when Y is

but otherwise H. If the polyester is acylated or esterified, as described later, the Z's also stand for alkoxy or acyl radicals, being alkoxy when Y is

but otherwise acyl. It will be understood that when Y is

it will be attached to the oxy group of an "L" group and that otherwise it will be linked to the carbonyl of an "L" group.

It will become apparent from the above illustrations and equations that the number of lactone residues in the vinyl lactone polyester will depend in large part upon the molar ratio of lactones to initiator.

The polymerization is, in accordance with the invention, carried out by heating a lactone, or combination of lactones, with an initiator, in the presence of the catalyst. In general, the catalyst should be present in a catalytically significant amount. A suitable catalytic concentration is from about 0.001 to about two percent by weight, based on the weight of lactone in the reaction mixture.

The preferred range of concentration for the catalyst is from about 0.01 to about 0.5 percent by weight, this more limited range being preferred because of the uniformly excellent results that are obtained.

The temperature to which the reactants are heated may vary from about 50° to about 300° C. Temperatures above this range are not desired because of the instability of the reactants and the products at such higher temperatures, whereas reaction temperatures below about 50° C. will result in prolonged reaction time. Temperatures within the range of about 130–200° C. are preferred because discoloration of the products is thereby avoided while a desirably rapid rate of reaction is retained.

The time of heating depends upon the particular combination of lactone and initiator, as well as upon the particular catalyst employed and its concentration. It is readily ascertainable for any given starting materials, catalyst, catalyst concentration, and temperature conditions by following the progress of the polymerization with refractive index measurements. The reaction may be regarded as complete as soon as the refractive index becomes constant. Generally, the reaction time will vary from a few minutes to not more than forty-eight hours and more usually between about one and ten hours.

It is preferable, in order to obtain a product of light color, to conduct the reaction in the absence of oxygen. This may be accomplished, for example, by operating in a partial vacuum or in the presence of an inert gas such as nitrogen, which may be passed through the reaction mixture. After the polymerization is completed, any unreacted monomer may be removed by applying a vacuum thereto at elevated temperature, e.g., a vacuum of 1 to 5 mm. mercury at 120° to 160° C.

The proportion of lactone to initiator may vary widely depending upon the particular properties desired in the polyester or the products to be made therefrom. Where the polyester is to have substantially the properties of a product having a succession of lactone residues, the proportion of initiator to lactone may be very small, inasmuch as theoretically one molecule of initiator is sufficient to initiate the polymerization of an infinite number of lactone molecules. On the other hand, where a poly-functional initiator is used and it is desired that the polyester product be of a conjugated structure in which the random distribution of lactone residues and polyfunctional compound residues is more or less alternating or where the polyfunctional initiator is a high molecular weight material such as a polyethylene glycol or vinyl polymer, the relative proportions may be approximately equal.

The lactone polyester products obtained in accordance with the invention have average molecular weights in the range of from about 300 to about 12,000, and higher, preferably from about 500 to about 9000, hydroxyl numbers from about 15 to about 374, and carboxyl numbers up to about 7, and preferably below 5. However, by using reactive vinyl polymers as initiators, as exemplified previously, the average molecular weights of the lactone polyesters can easily go as high as 20,000, and higher. They also have reactive terminal hydroxyl or carboxyl groups, the number of reactive terminal groups depending upon the functionality of the initiator. They are characterized by the presence of at least two, and generally a series of interconnected, substantially linear units or groups composed of carbon, hydrogen, and oxygen. The units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. Unless the initiator employed contained a carboxyl group, the oxy group of the lactone residue, or the last lactone residue in a series, is connected to a hydrogen to form a terminal hydroxyl group at that end thereof. It is pointed out at this time that the terms "lactone polyester" or "lactone copolyester," as used herein including the appended claims, signifies that there is at least two of the aforesaid linear groups therein.

In addition, the polyesters of the invention are eminently suitable as plasticizers in various resins, e.g., vinyl chloride-vinyl acetate resins, particularly if they are acylated in known manner to insolubilize the terminal hydroxyl groups and thus improve their resistance to extraction by water from resins with which they are combined.

In illustrative Examples 1–13 below, which are included to illustrate the best modes now contemplated for carrying out the invention, initiators, lactones and catalysts, of varying amounts and identities, were mixed and heated to a controlled temperature of 175° C. while a slow stream of nitrogen was passed through the mixture to exclude air and moisture, thus preventing discoloration of the polyester from oxygen. The hydroxyl and carboxyl numbers of the resulting polyesters were determined by the method described in Ind. Eng. Chem., Anal. Ed., vol. 17, page 394 (1945). The polymerization was followed by refractive index measurements at 30° C., the reaction being regarded as complete as soon as the index became constant.

*Example 1*

To a reaction flask equipped with stirrer, thermometer, nitrogen inlet tube, and reflux condenser, there were charged 894 grams of epsilon-caprolactone, 106.12 grams of diethylene glycol, and 0.010 gram of stannous octoate catalyst. The reactant mixture was heated to a temperature of 175° C. for a period of 7 hours under an atmosphere of dry nitrogen. The resulting polyester product had a hydroxyl number of 111, a carboxyl number of 0.35, and a molecular weight of about 1005. $N_D^{50}$ 1.4619 was obtained after heating 7 hours at 175° C.

*Example 2*

To a reaction flask equipped with stirrer, thermometer, nitrogen inlet tube, and reflux condenser, there were charged 894 grams of epsilon-caprolactone, 106.12 grams of diethylene glycol, and 0.050 gram of stannous octoate catalyst. The reactant mixture was heated to a temperature of 175° C. for a period of 7 hours under an atmosphere of dry nitrogen. The resulting polyester product had a hydroxyl number of 110.6, a carboxyl number of 0.06, a molecular weight of about 1004, and a melting point of 32–36° C. $N_D^{50}$ 1.4620 was obtained after heating 2 hours at 175° C.

*Example 3*

To a reaction flask equipped with stirrer, thermometer, nitrogen inlet tube, and reflux condenser, there were charged 436 grams of epsilon-caprolactone, 63.67 grams of diethylene glycol and 0.50 gram of stannous octoate catalyst. The reactant mixture was heated to a temperature of 175° C. for a period of 7.5 hours under an atmosphere of dry nitrogen. The resulting polyester product had a hydroxyl number of 131.2, a carboxyl number of 0.03, a molecular weight of about 855, and a melting point of 37–42° C. The desired refractive index was obtained after heating 1¼ hours at 175° C. $N_D^{50}$ 1.4612.

*Example 4*

To a reaction flask equipped with stirrer, thermometer, nitrogen inlet tube, and reflux condenser, there were charged 367 grams of epsilon-caprolactone, 132.65 grams of diethylene glycol, and 0.025 gram of stannous octoate catalyst. The reactant mixture was heated to a temperature of 175° C. for a period of 7.5 hours under an atmosphere of dry nitrogen. The resulting polyester product had a hydroxyl number of 276.3, a carboxyl number of 0.03, a molecular weight of about 406, and a viscosity of 260 centipoises at a temperature of 25° C.

*Example 5*

To a reaction flask equipped with stirrer, thermometer, nitrogen inlet tube, and reflux condenser, there were charged 436 grams of epsilon-caprolactone, 63.67 grams of diethylene glycol, and 0.25 gram of stannous oleate catalyst. The reactant mixture was heated to a temperature of 175° C. for a period of 7.5 hours under an atmosphere of dry nitrogen. The resulting polyester product had a hydroxyl number of 129.2, a carboxyl number of 0.03, a molecular weight of about 868, and a melting point of 36–42° C. The desired refractive index was obtained after heating at 175° C. for 5½ hours. $N_D^{50}$ 1.4612.

*Example 6*

To a reaction flask equipped with stirrer, thermometer, nitrogen inlet tube, and reflux condenser, there were charged 436 grams of epsilon-caprolactone, 63.67 grams of diethylene glycol, and 0.25 gram of tin tetra(2-ethylhexylate) catalyst. The reactant mixture was heated to a temperature of 175° C. for a period of 7.25 hours under an atmosphere of dry nitrogen. The resulting polyester product had a hydroxyl number of 131.4, a carboxyl number of 0.35, a molecular weight of about 849, and a viscosity of 520 centipoises at a temperature of 25° C. $N_D^{50}$ 1.4612 was obtained after heating 7¼ hours at 175° C.

*Example 7*

To a reaction flask equipped with stirrer, thermometer, nitrogen inlet tube, and reflux condenser, there were charged 436 grams of a mixture of methyl epsilon-caprolactones, 63.67 grams of diethylene glycol, and 0.25 gram of stannous octoate catalyst. The reactant mixture was heated to a temperature of 175° C. for a period of 7.25 hours under an atmosphere of dry nitrogen. The resulting polyester product had a hydroxyl number of 129.8, a carboxyl number of 0.16, a molecular weight of about 862, and a viscosity of 950 centipoises at a temperature of 25° C.

*Example 8*

To a reaction flask equipped with stirrer, thermometer, nitrogen inlet tube, and reflux condenser, there were charged 349 grams of epsilon-caprolactone, 87 grams of a mixture of methyl epsilon-caprolactones, 63.67 grams of diethylene glycol, and 0.25 gram of stannous octoate catalyst. The reactant mixture was heated to a temperature of 175° C. for a period of 7.25 hours under an atmosphere of dry nitrogen. The resulting polyester product had a hydroxyl number of 130.7, a carboxyl number of 0.03, a molecular weight of about 858, and a viscosity of 1060 centipoises at a temperature of 25° C. $N_D^{50}$ 1.4610 was obtained after heating 1¼ hours at 175° C.

*Example 9*

To a reaction flask equipped with stirrer, thermometer, nitrogen inlet tube, and reflux condenser, there were charged 493 grams of epsilon-caprolactone, 6.63 grams of diethylene glycol, and 0.25 gram of stannous octoate catalyst. The reactant mixture was heated to temperature of 175° C. for a period of 7.25 hours under an atmosphere of dry nitrogen. The resulting polyester product had a hydroxyl number of 13.2, a carboxyl number of 0.21, a molecular weight of about 8232, and a melting point 57–58° C. $N_D^{50}$ 1.4645 was obtained after heating 1 hour at 175° C.

*Example 10*

To a reaction flask equipped with stirrer, thermometer, nitrogen inlet tube, and reflux condenser, there were charged 464 grams of epsilon-caprolactone, 36.06 grams of ethylenediamine, and 0.25 gram of stannous octoate catalyst. The reactant mixture was heated to a temperature of 175° C. for a period of 7.25 hours under an atmosphere of dry nitrogen. The resulting polyester product had a hydroxyl number of 131.3, a carboxyl number of 0, a molecular weight of about 854, and a melting point of 36–46° C. $N_D^{50}$ 1.4752 was obtained after heating 4 hours at 175° C.

*Example 11*

To a reaction flask equipped with stirrer, thermometer, nitrogen inlet tube, and reflux condenser, there were charged 464 grams of epsilon-caprolactone, 36.65 grams of ethanolamine, and 0.25 gram of stannous octoate catalyst. The reactant mixture was heated to a temperature of 175° C. for a period of 7.25 hours under an atmosphere of dry nitrogen. The resulting polyester product had a hydroxyl number of 128.5, a carboxyl number of 0.25, a molecular weight of about 870, and a melting point of 34–43° C. $N_D^{50}$ 1.4685 was obtained after heating 2½ hours at 175° C.

*Example 12*

To a reaction flasv equipped with stirrer, thermometer, nitrogen inlet tube, and reflux condenser, there were charged 485 grams of epsilon-caprolactone, 15.34 grams of glycerine, and 0.25 gram of stannous octoate catalyst. The reactant mixture was heated to a temperature of 175° C. for a period of 7.25 hours under an atmosphere of dry nitrogen. The resulting polyester product had a hydroxyl number of 52.4, a carboxyl number of 0.11, a molecular weight of about 3200, and a melting point of 53–54° C. $N_D^{50}$ 1.4649 was obtained after heating 1½ hours at 175° C.

*Example 13*

To a reaction flask equipped with stirrer, thermometer, nitrogen inlet tube, and reflux condenser, there were charged 436 grams of epsilon-caprolactone, 63.67 grams of diethylene glycol, and 0.25 gram of tin tetraacetate catalyst. The reactant mixture was heated to a temperature of 175° C. for a period of 4 hours under an atmosphere of dry nitrogen. The resulting polyester product had a hydroxyl number of 130.7, a carboxyl number of 0.02, a molecular weight of about 858, and a melting point of 34–39° C. $N_D^{50}$ 1.4613 was obtained after heating 2 hours at 175° C.

*Example 14*

To a reaction flask equipped with stirrer, thermometer, nitrogen inlet tube, and reflux condenser, there were charged 436 grams of epsilon-caprolactone, 63.67 grams of diethylene glycol, and 0.25 gram of stannous octoate catalyst. The reactant mixture was heated to a temperature of 120° C. for a period of 7.5 hours under an atmosphere of dry nitrogen. The resulting polyester product had a hydroxyl number of 132.0, a carboxyl number of 0.54, a molecular weight of about 843, and a viscosity of 560 centipoises at a temperature of 25° C.

What is claimed is:

1. A process which comprises heating a lactone of the formula:

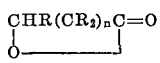

wherein $n$ is an integer of from four to six, wherein at least $n+2$ R's are hydrogen, and wherein the remaining R's are of the groups consisting of hydrogen, alkyl, cycloalkyl, alkoxy, and single ring aromatic hydrocarbon radicals; with an organic functional initiator having at least one reactive hydrogen substituent capable of opening the lactone ring; in the presence of stannous diacylate as the catalyst therefor; to a temperature of at least about 50° C.; said lactone being in sufficient molar excess with relation to said organic functional initiator to produce a product having at least two substantially linear groups of the formula:

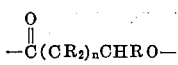

wherein the variables $n$ and R have the aforesaid meanings; said product having an average molecular weight of at least about 300.

2. A process which comprises heating a lactone of the formula:

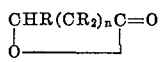

wherein $n$ is an integer of from four to six, wherein at least $n+2$ R's are hydrogen, and wherein the remaining R's are of the groups consisting of hydrogen, alkyl, cycloalkyl, alkoxy, and single ring aromatic hydrocarbon radicals; with an organic functional initiator having at least one reactive hydrogen substituent and being of the group consisting of alcohols, amines, polyols, polyamines, amino alcohols, polycarboxylic acids, hydroxycarboxylic acids, and aminocarboxylic acids; in the presence of stannous diacylate as the catalyst therefor; to a temperature in the range of from about 50° to 300° C.; said lactone being in sufficient molar excess with relation to said organic functional initiator to produce a product having at least two substantially linear groups of the formula:

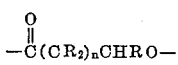

wherein the variables $n$ and R have the aforesaid meanings; said product having an average molecular weight of at least about 300 and a hydroxyl number no greater than 374.

3. The process of claim 2 wherein said product has an average molecular weight of from about 500 to 7000.

4. The process of claim 3 wherein said catalyst is stannous dialkanoate.

5. The process of claim 4 wherein said catalyst is stannous dioctanoate.

6. A process which comprises heating epsilon-caprolactone with a hydroxyl-containing initiator, to a temperature in the range of from about 50° to 300° C., in the presence of stannous dialkanoate as the catalyst therefor, said epsilon-caprolactone being in sufficient molar excess with relation to said initiator to produce a lactone polyester which has at least one hydroxyl end group and at least two substantially linear groups therein, each of said linear groups having a terminal oxy group at one end, a carbonyl group at the other end, and an intermeditae chain of five methylene groups, said lactone polyester having an average molecular weight of from about 300 to 12,000 and a hydroxyl number of from 374 to 15.

7. The process of claim 6 wherein said catalyst is stannous dioctanoate.

8. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a hydroxyl-containing initiator; in the presence of stannous dialkanoate as the catalyst therefor; to a temperature in the range of from about 50° to 300° C.; said admixture of epsilon-caprolactone being in sufficient molar excess with relation to said initiator to produce a lactone copolyester which has at least one hydroxyl end group and at least two substantially linear groups therein, each of said linear groups having a terminal oxy group at one end, a carbonyl group at the other end, and an intermediate chain of five carbon atoms; said lactone copolyester having an average molecular weight of from about 300 to 12,000 and a hydroxyl number of from 374 to 15.

9. The process of claim 8 wherein said catalyst is stannous dioctanoate.

10. A process which comprises heating epsilon-caprolactone with an amino-containing initiator, to a temperature in the range of from about 50° to 300° C., in the presence of stannous dialkanoate as the catalyst therefor, said epsilon-caprolactone being in sufficient molar excess with relation to said initiator to produce a lactone polyester which has at least one hydroxyl end group and at least two substantially linear groups therein, each of said linear groups having a terminal oxy group at one end, a carbonyl group at the other end, and an intermediate chain of five methylene groups, said lactone polyester having an average molecular weight of from about 300 to 12,000 and a hydroxyl number of from 374 to 15.

11. A process which comprises heating an admixture containing epsilon-caprolactone and a substituted epsilon-caprolactone, said substituted epsilon-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with an amino-containing initiator; in the presence of stannous dialkanoate as the catalyst therefor; to a temperature in the range of from about 50° to 300° C.; said admixture of epsilon-caprolactone being in sufficient molar excess with relation to said initiator to produce a lactone copolyester which has at least one hydroxy end group and at least two substantially linear groups therein, each of said linear groups having a terminal oxy group at one end, a carbonyl group at the other end, and an intermediate chain of five carbon atoms; said lactone copolyester having an average molecular weight of from about 300 to 12,000 and a hydroxyl number of 374 to 15.

12. A process which comprises heating epsilon-caprolactone with a carboxyl-containing initiator, to a temperature in the range of from about 50° to about 300° C., in the presence of stannous dialkanoate as the catalyst therefor, said epsilon-caprolactone being in sufficient molar excess with relation to said initiator to produce a lactone polyester which has at least one carboxyl end group and at least two substantially linear groups therein, each of said linear group having a terminal oxy group at one end, a carbonyl group at the other end, and an intermediate chain of five methylene groups, said lactone polyester having an average molecular weight of from about 300 to 12,000 and a hydroxyl number of from 374 to 15.

13. A process which comprises heating an admixture containing epsilon-caprolactone and a substituted epsilon-caprolactone, said substituted eplison-caprolactone having up to three alkyl substituents, none of said substituents having more than 12 carbon atoms, the total number of said carbon atoms in the substituents not exceeding 12, and at least one hydrogen substituent on the carbon atom which is attached to the oxy group in the substituted lactone ring; with a carboxyl-containing initiator; in the presence of stannous dialkanoate as the catalyst therefor; to a temperature in the range of from about 50° to 300° C.; said admixture of epsilon-caprolactone being in sufficient molar excess with relationship to said iniator to produce a lactone copolyester which has at least one carboxyl end group and at least two substantially linear groups therein, each of said linear groups having a terminal oxy group at one end, a carbonyl group at the other end, and an intermediate chain of five carbon atoms; said lactone copolyester having an average molecular weight of from about 300 to 12,000 and a hydroxyl number of from 374 to 15.

References Cited by the Examiner
UNITED STATES PATENTS
2,890,208  6/1959  Young et al. ____ 260—78.3

JOSEPH L. SCHOFER, *Primary Examiner.*
L. WOLF, *Assistant Examiner.*